Sept. 16, 1958 A. P. M. COCHRANE 2,851,897
SCREW AND NUT ASSEMBLY
Filed March 5, 1957
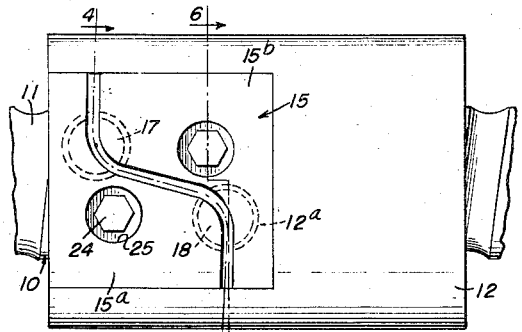
FIG. 1
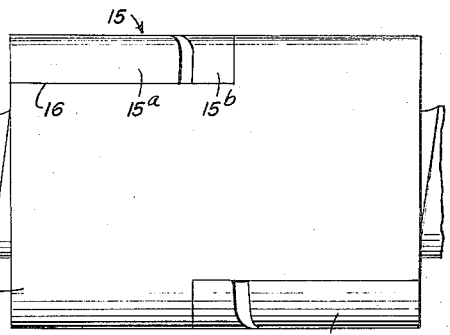
FIG. 2
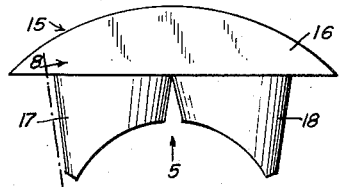
FIG. 3
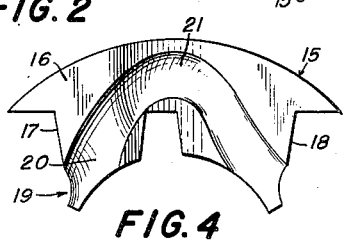
FIG. 4
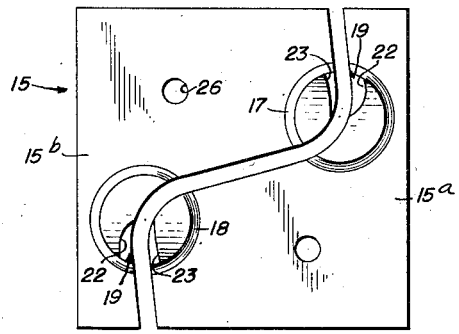
FIG. 5
FIG. 8
FIG. 10
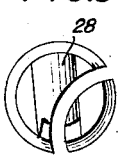
FIG. 9
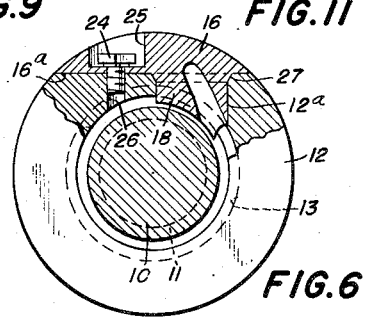
FIG. 11
FIG. 6
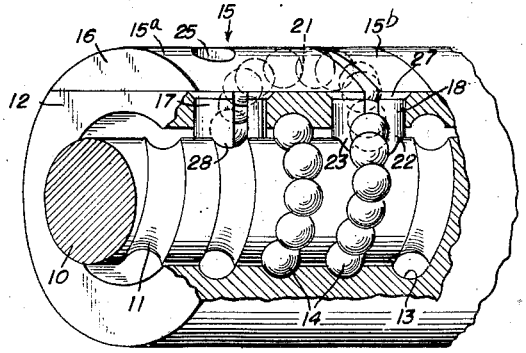
FIG. 7
INVENTOR
ALFRED P. M. COCHRANE
BY
ATTORNEY

United States Patent Office 2,851,897
Patented Sept. 16, 1958

2,851,897

SCREW AND NUT ASSEMBLY

Alfred P. M. Cochrane, Detroit, Mich.

Application March 5, 1957, Serial No. 643,988

9 Claims. (Cl. 74—459)

This invention relates to screw and nut actuated motion transmitting mechanism of the type wherein the driving connection between a helically grooved screw member and a complementary nut member is effected by means of a train of spherical balls arranged to continuously circulate in predetermined convolutions formed jointly by the helical grooves of the screw and nut, whereby rotary movement of either the screw or the nut is translated into axial displacement or linear movement of the other member. More particularly, the invention consists in new and useful improvements in means for effecting the transfer or return of the balls from a discharge point adjacent one convolution, to a selected inlet point adjacent a preceding convolution, so as to maintain a continuous circulation of balls within a predetermined helical path.

Many prior attempts have been made to solve the problem of efficiently recirculating an endless path of balls. For example, devices have been proposed for the transfer of the balls in a single helical convolution by means of end stops projecting into the screw grooves with a connecting channel either substantially within the confines of the nut wall or in an external connecting tube. In another arrangement, the balls are guided in their transfer movement from one end of the helical convolution to the other, by a bridge member affixed between the screw shaft and its nut and secured to the latter so as to extend across a plurality of screw crests.

However, all of these prior attempts have proven objectionable either from the standpoint of difficulty in construction and assembly or a limitation in the number of convolutions carrying balls under load, without unduly increasing the size of the nut member or the necessity of providing the return path through an external tube which is obviously objectionable.

Another disadvantage to be noted in connection with certain of the known ball transfer devices lies in the fact that in order to accommodate the transfer element and to avoid an abrupt change in the direction of ball travel at the inception of the return movement, it has been necessary to provide a considerable annular clearance between the inside diameter of the nut member and the outside diameter of the screw member which has materially reduced the loading characteristics of each ball running in the helical convolutions. In other words, an unnecessarily large area of each ball lies in this annular clearance and is therefore not under load in either the nut or screw groove.

It is therefore the primary object of this invention to provide a ball transfer insert for the nut member of a screw and ball nut assembly which will increase the number of convolutions carrying balls under load, thus enabling a nut of a given length to pack more load carrying balls.

Another object of the invention is to provide a screw and ball nut assembly of this character having a materially reduced clearance between the inside diameter of the nut and the outside diameter of the screw with the result that each ball is afforded a greater loading characteristic.

Still another object of the invention is to provide a transfer insert for the nut member which is externally affixed and lies entirely within the peripheral confines of the nut, thus simplifying manufacture and assembly.

A further object of the invention lies in the provision of a shorter nut for an equivalent number of balls under load which greatly facilitates the grinding operation, a consideration of prime importance from the standpoint of manufacture.

A still further object of the invention is to provide a transfer element or insert having inwardly projecting ball directing lugs which are so arranged with respect to one another and to the convolutions of the screw member, as to overlie a minimum in excess of one and one-half convolutions and less than two convolutions and being designed to pick up the balls from one convolution and simultaneously initiate their transfer in a continuous circular movement, as distinguished from previous devices which pick up the balls tangentially and then subject them to a course of travel which requires at least two right angular turns.

Another object of the invention is to provide a transfer insert for the nut member which is externally affixed and adapts itself perfectly to any outside configuration of the nut and can lie entirely within the peripheral confines of the nut, thus simplifying manufacture and assembly.

Still another object of the invention is to avoid weakening the structure of the nut, in axial loading, by long wide slots completely traversing the wall of the nut.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views.

Figure 1 is a top plan view of the improved screw and nut assembly.

Figure 2 is a view in side elevation showing the relationship of two transfer inserts, respectively applied to opposite sides of the periphery of the nut member.

Figure 3 is an end elevation of an insert member having tapered lugs.

Figure 4 is an elevational view of one of the interchangeable sections of a two-part ball transfer insert, taken on angular line 4—4 of Figure 1.

Figure 5 is a bottom plan view of the composite insert, looking in the direction of the vertical arrow 5 in Figure 3.

Figure 6 is a transverse sectional view taken on line 6—6 of Figure 1, but showing a modified insert with cylindrical lugs.

Figure 7 is a perspective view of a screw and nut assembly similar to Figure 6, with a portion of the wall of the nut broken away to illustrate the course followed by the train of balls traveling in the convolutions of the screw and nut and the return path formed in the transfer insert.

Figure 8 is a fragmentary elevational view of one of the ball directing lugs taken on line 8—8 of Figure 3, showing the entrance and/or exit throat and the associated ball directing lips.

Figure 9 is an elevational view of the lower extremity of a beveled lug similar to those shown in Figure 5, but modified to include an extension of the end form to coincide with the underlying helical convolutions of the screw member.

Figure 10 is a fragmentary elevation similar to Figure 8 but showing the extended form illustrated in Figure 9.

Figure 11 is a fragment view of the right lug of Figure 4 modified to provide the extended form into the helical convolution of the screw, as in Figures 9 and 10.

In the drawings 10 represents a spirally grooved shaft or screw member having the usual external helical grooves 11 which may extend the full length of the shaft or over any desired portion thereof. Associated with the screw member 10 is a nut member 12 which may be cylindrical, rectangular or any other desired shape and is provided with a series of complementary internal helical grooves 13 adapted to coact with the screw grooves 11 in providing a raceway for a series of balls 14 which are free to move and continuously circulate in the helix provided by the screw shaft and nut. Thus, rotary movement of the screw shaft in either direction is translated by the thrust transmitted through the balls 14 into an endwise or axial displacement of the nut or vice versa.

The nut 12 is constructed of sufficient wall thickness to accommodate a ball transfer insert as will later appear, and the annular clearance between the screw and nut members is somewhat in excess of that normal for purely mechanical clearance.

The ball transfer insert of the present invention is generally represented by the numeral 15 and although it may be constructed in one piece, it is preferably formed in two interchangeable sections, separated along the transfer path of the balls as shown in the drawings and hereinafter described. The insert illustrated comprises a segmental body portion 16 designed to fit a complementary flat bottomed area 16a, milled in the external periphery of the nut 12, said body portion being externally contoured to form substantially a continuation of the periphery of the nut. The underside or flattened bottom of the body portion 16 is provided with two integral lugs 17 and 18 which project through complementary openings 12a in the wall of the nut member 12 and extend at right angles to the longitudinal axis of the screw shaft 10. These lugs are located diagonally to the longitudinal axis of the screw and are preferably spaced to overlie a minimum in excess of one and one-half convolutions of the groove 11 and less than two convolutions, their inner extremities being radiused to afford normal clearance with the outside diameter of the underlying screw member and terminating slightly within the pitch circle diameter of the train of balls 14 running in the helical convolutions of the grooves 11 and 13.

The leading extremity of the lug 17 and the trailing extremity of the oppositely disposed lug 18 (assuming that the screw 10 is being turned in clockwise direction as viewed from the left in the drawings) are provided with ball directing mouths 19 formed partially in the respective peripheral portions of the lugs and partially in their radiused ends. The mouths 19 form the inlet and outlet openings of ball conducting throats 20 provided in the respective lugs 17 and 18, said throats being connected by a diagonal channel 21 formed entirely within the confines of the body portion 16 of the insert. The boundaries of the mouths 19 provide at their respective openings, a pair of opposed curved ball engaging lips 22 and 23, aligned with the underlying convolutions of the raceway formed by the grooves 11 and 13, so as to successively engage the balls 14 slightly below the pitch circle diameter of the train of balls as the latter advance in said convolutions. It will be noted from Figure 5 that the contours of the lips 22—23 which form the underpart of the mouth 19 are generated so as to cooperate in describing the throat 20, directed at compound angles with respect to the axis of the screw, into the channel 21 so as to form with said channel a continuous generated path contoured at each end to simultaneously either pick up the balls and initiate their transfer to the other end, or to return the balls from the channel to the raceway, depending upon the direction of rotation of the screw shaft.

In a modification of the design, the extremities of the lugs 17 and 18 will be cast or formed to agree with the underlying helical convolutions of the screw, subject to mechanical clearance, as shown as 28 in Figures 9–11. In the generation of the ball path with a spherical cutter, this helical section will be shaped to be substantially like a curved shovel to fortify the lifting action of the mouth 19 and lips 22—23.

In either form, as the screw shaft 10 rotates in clockwise direction, assuming that said shaft is provided with a lefthand screw groove as shown in the drawings, the train of balls traveling in the convolutions spanned by the lugs 17 and 18, will be under load to cause the linear movement of the nut 12 to the right in Figures 1 and 7. As the balls in the extreme left-hand helix of the nut groove 13 approach the lips 22 and 23 of the lug 17, they are lifted from the corresponding convolution of the screw groove 11, entering the throat 20 and simultaneously starting their transfer course through the channel 21. The diagonal channel 21 which as before stated is formed within the confines of the insert body 16, is located radially beyond the nut grooves 13 so that the balls received from the throat of lug 17 are elevated and transferred over the intervening convolutions and transferred into the discharge throat 20 of lug 18, whereupon they are deposited in the convolution which at the time, is located adjacent the mouth 19 of lug 18. Thus, a continuous circulation of the balls 14 is effected so long as the screw shaft 10 is rotated.

Obviously, the reverse rotation of the screw shaft 10 will cause the reverse action of the ball transfer insert and circulate the balls from the mouth of lug 18 through the channel 21 and discharge them through the mouth of the lug 17, causing linear movement of the nut 12 in the opposite direction.

The insert 15 may be secured in place in the periphery of the nut 12 as shown in Figure 1 of the drawings, by the use of short bolts or screws 24 preferably inset in recesses 25 in the body 16 and extending through threaded openings 26 in the wall of the nut 12 and located to lie between the helical convolutions. In the form of the invention shown in the drawings, where the insert is formed in two interchangeable sections which may be indicated as 15a and 15b, the bolts 24 are so arranged that each bolt or screw will secure one of the sections in place.

As previously stated, the nut 12 may be designed to accommodate two or more ball return inserts and as shown in Figure 2, a second insert 15c, is located at the opposite end of the nut 12 at 180° from the previously described insert 15. This second insert 15c is identical with the insert 15 and causes a circulation of another train of balls through a corresponding group of convolutions. Preferably, in order to permit a shorter nut, the opposed inserts 15 and 15c overlap slightly or closely approach overlapping relation within the limits of the proper functioning of the two groups of circulating balls. Of course, a nut can be provided with more than two inserts with a relative spacing such as to prove desirable and practical.

In the manufacture of these screw and nut assemblies the diameter of the protruding lugs is limited, adjacent the screw, inter alia, by the screw lead and resulting width of screw crests. To provide adequate metal to encompass the ball path in the lugs and transfer element, the preferred form of bores 12a and complementary lugs 17—18, is tapered as shown in Figure 3 for example. However, under some conditions it may be desirable to provide these bores and lugs in cylindrical form as shown in Figures 6 and 7. In Figure 6 the cylindrical lug 18 is provided with a flared enlargement 27 adjacent the overlying transfer body and the bore 12a is naturally provided with a complementary counterbore. Of course, one of the advantages of the tapered structure is that it facilitates the insertion of the lugs in their respective complementary openings 12a in the well of the nut.

One of the main advantages of the present invention lies in the design which makes possible the use of a casting, for the master pattern, actually made in a bored and prepared nut with screw in situ and the use of a spherical cutter in the generation of a ball return path or channel through the insert, from the inlet to the exit points in the respective lugs, to provide either a one piece transfer insert or a two piece insert, split vertically along the center line of the ball path, each piece being interchangeable. After providing a master pattern for the inserts, reproductions are possible for production purposes in the form of metal die castings, plastic moldings or by the lost wax process and the like.

The cutter used to generate the transfer path is of a diameter in excess of the ball diameter to provide mechanical clearance. The method use for producing the master pattern is more or less conventional in operations of this nature and consists in using a universal pantograph machine tool, oversize master parts for the guiding ball head, production dimensioned parts and a vertically mounted spherical cutter.

It will be apparent that with this improved screw and nut assembly including the transfer insert just described, I have provided more load carrying balls in a given nut length, with a marked reduction in the annular clearance between the screw and nut so that the helical grooves have better load carrying characteristics through the deepening of the ball channel. This latter advantage is made possible by the exterior fixation of the insert to the periphery of the nut member as distinguished from the interior mounting in some of the known devices of this general nature. Furthermore, the present design lends itself to much quicker machining and assembly methods.

The invention makes it possible to precharge the screw and nut assembly with the required complement of balls, prior to the assembly of the transfer insert and to separately fill the latter and subsequently complete the assembly.

An added advantage lies in the ability to accurately locate the insert or inserts in all planes without hand adjustments and to provide for easy mounting by external means.

From the foregoing it is believed that the invention will be readily understood by those skilled in the art without further description, it being borne in mind that numerous changes may be made in the details disclosed without departing from the spirit of the invention as set forth in the following claims.

I claim:

1. Screw and nut actuating mechanism of the type having a screw member, a nut member, complementary helical grooves in respective members and at least one train of spherical balls travelling in said grooves, means in said nut member for transferring said balls from one end to the other of a helical path, comprising a segmental insert adapted for external fixation to said nut member, a ball transfer conduit in said insert, defined by cylindrical walls radially separating said conduit from the periphery of said screw member and diagonally disposed with respect to the axis of the latter, to span a selected series of convolutions of said helical grooves, inlet and outlet lugs formed integrally with said insert at opposite termini of said conduit, projecting inwardly at right angles to the longitudinal axis of said screw member, the projecting extremities of said lugs being radiused to afford normal clearance with the outside diameter of the underlying screw member, gradually curved ball directing throats in each of said lugs, internally contiguous with the corresponding termini of said conduit and opening at their opposite ends within the pitch circle diameter of the train of balls running in said grooves, the open ends of respective throats being formed with opposed, gradually inclined ball engaging surface areas aligned with the underlying screw convolutions, within said pitch circle diameter, to form with said conduit, a continuous generated path between the inlet and outlet points.

2. Screw and nut actuating mechanism as claimed in claim 1, wherein said inlet and outlet lugs are tapered toward their projecting extremities and fit in complementary tapered openings in said nut member.

3. Screw and nut actuating mechanism as claimed in claim 1, wherein said inlet and outlet lugs are cylindrical in form and fit in complementary cylindrical openings in said nut member.

4. Screw and nut actuating mechanism as claimed in claim 1, wherein said insert, including said lugs, comprises two opposed, interchangeable sections, the separating line following the central axis of the ball path formed jointly by said throats and channel, each section including a portion of said body and an integral portion of each of said lugs.

5. Screw and nut actuating mechanism as claimed in claim 1, wherein the inner ends of said lugs are radiused to conform to the outside diameter of the underlying screw member and the mouths of said throats include an extension of the lips consisting of a shaped projection to agree with the underlying helical convolution, with mechanical clearance, whereby their action resembles that of a shovel, said throats being respectively aligned with the underlying convolutions of said helical grooves.

6. Screw and nut actuating mechanism as claimed in claim 1, wherein said nut member is provided with a plurality of said inserts, spaced annularly around the periphery of said nut member.

7. Screw and nut actuating mechanism as claimed in claim 6, wherein the corresponding extremities of opposed inserts at least closely approach overlapping axial relation to one another.

8. Screw and nut actuating mechanism as claimed in claim 1, wherein said inlet and outlet lugs are spaced longitudinally of the axis of said screw member, to overlie a minimum in excess of one and one-half convolutions and less than two convolutions of said screw member.

9. Screw and nut actuating mechanism as claimed in claim 1, wherein said segmental insert lies entirely within the radial confines of said nut member.

References Cited in the file of this patent

UNITED STATES PATENTS

| | | |
|---|---|---|
| 1,831,080 | Schmidt | Nov. 10, 1931 |
| 2,298,011 | Hoffar | Oct. 6, 1942 |
| 2,468,506 | Millns | Apr. 26, 1949 |
| 2,618,166 | Douglas | Nov. 18, 1952 |